US008798847B2

(12) United States Patent
Isaac

(10) Patent No.: US 8,798,847 B2
(45) Date of Patent: Aug. 5, 2014

(54) METHOD AND SYSTEM FOR REMOTE DIAGNOSTICS OF VESSELS AND WATERCRAFTS

(75) Inventor: Emad S. Isaac, Downers Grove, IL (US)

(73) Assignee: The Morey Corporation, Woodridge, IL (US)

( * ) Notice: Subject to any disclaimer, the term of this patent is extended or adjusted under 35 U.S.C. 154(b) by 0 days.

(21) Appl. No.: 13/473,220

(22) Filed: May 16, 2012

(65) Prior Publication Data

US 2013/0311002 A1 Nov. 21, 2013

(51) Int. Cl.
*G06F 7/00* (2006.01)
*G06F 11/30* (2006.01)
*G06F 19/00* (2011.01)
*G01M 17/00* (2006.01)

(52) U.S. Cl.
USPC .......................................... 701/29.4; 701/36

(58) Field of Classification Search
CPC .......... G06F 7/00; G06F 17/00; G06F 19/30; G06F 8/30; G06F 3/00; G06Q 10/00; G06Q 30/02; G06Q 20/102; H04W 4/05; H04W 4/00; H04W 64/00; H04W 24/00
USPC ........... 701/35, 30, 29, 36, 117, 202, 1, 32.3, 701/33; 340/425.5, 870.7, 825.49, 426.1, 340/988
See application file for complete search history.

(56) References Cited

U.S. PATENT DOCUMENTS 6,273,771 B1 8/2001 Buckley et al.
6,298,308 B1 10/2001 Reid et al.
6,362,730 B2 3/2002 Razavi et al.
6,836,539 B2 12/2004 Katou et al.
6,957,133 B1 10/2005 Hunt et al.
7,027,808 B2 4/2006 Wesby
7,113,127 B1 9/2006 Banet et al.
7,113,852 B2 9/2006 Kapadia et al.
7,228,211 B1 6/2007 Lowrey et al.
7,317,974 B2 1/2008 Luskin et al.
7,353,095 B2 4/2008 Kanno et al.
7,397,363 B2 7/2008 Joao
7,516,193 B2 * 4/2009 Motoyama et al. ........... 709/217
7,522,980 B2 4/2009 Watkins et al.
7,523,159 B1 4/2009 Williams et al.
7,650,210 B2 * 1/2010 Breed .......................... 701/31.9
7,904,219 B1 * 3/2011 Lowrey et al. ............... 701/32.3
2005/0201545 A1 * 9/2005 Rockett et al. ........... 379/265.01
2005/0258942 A1 11/2005 Manasseh et al.
2006/0047385 A1 * 3/2006 Robinson et al. ............... 701/35
2006/0136105 A1 * 6/2006 Larson ............................ 701/30
2006/0155437 A1 * 7/2006 Wang et al. ..................... 701/29
2006/0176193 A1 8/2006 Wraight
2006/0211446 A1 * 9/2006 Wittmann et al. ......... 455/552.1
2006/0235688 A1 * 10/2006 Bicego et al. ................. 704/254
2007/0121641 A1 * 5/2007 Hovey et al. ............... 370/395.2
2007/0124046 A1 * 5/2007 Ayoub et al. .................... 701/36
2008/0077310 A1 * 3/2008 Murlidar et al. .............. 701/117
(Continued)

*Primary Examiner* — Calvin Cheung
*Assistant Examiner* — Luis A Martinez Borrero
(74) *Attorney, Agent, or Firm* — Vedder Price P.C.

(57) ABSTRACT

The present disclosure generally relates to a bidirectional communication platform using short message communication with a telematics device for remotely updating parameters of the device, for obtaining reports and other information regarding the parameters of the device, and to upload control data and specific data to the device. More specifically, a software adaptation layer is added to a telematics device to bidirectionally communicate with receiver and emitter cell phones.

14 Claims, 7 Drawing Sheets

(56) References Cited

U.S. PATENT DOCUMENTS

| | | | | |
|---|---|---|---|---|
| 2008/0122591 | A1* | 5/2008 | Schofield et al. | 340/425.5 |
| 2009/0027229 | A1* | 1/2009 | Fortson et al. | 340/870.07 |
| 2009/0051566 | A1* | 2/2009 | Olsen et al. | 340/825.49 |
| 2009/0177350 | A1* | 7/2009 | Williams et al. | 701/29 |
| 2009/0222200 | A1* | 9/2009 | Link et al. | 701/202 |
| 2009/0306834 | A1* | 12/2009 | Hjelm et al. | 701/1 |
| 2010/0070107 | A1* | 3/2010 | Berkobin et al. | 701/1 |
| 2010/0085171 | A1* | 4/2010 | Do | 340/426.1 |
| 2010/0153207 | A1* | 6/2010 | Roberts et al. | 705/14.41 |
| 2010/0235891 | A1* | 9/2010 | Oglesbee et al. | 726/5 |
| 2011/0021234 | A1* | 1/2011 | Tibbitts et al. | 455/517 |
| 2011/0028128 | A1* | 2/2011 | Cazanas et al. | 455/414.1 |
| 2011/0039586 | A1* | 2/2011 | Madhavan et al. | 455/466 |
| 2011/0063138 | A1* | 3/2011 | Berkobin et al. | 340/988 |
| 2011/0098879 | A1* | 4/2011 | Basir et al. | 701/33 |

* cited by examiner

METHOD AND SYSTEM FOR REMOTE DIAGNOSTICS OF VESSELS AND WATERCRAFTS

FIELD OF THE DISCLOSURE

The present disclosure generally relates to an onboard remote integrated telematics system controlled by local systems for diagnostics, optimized maintenance, and other applications, and more specifically to a remote integrated device with a software interface for two way control of vessel and watercraft equipment operated remotely via software system over a communication network.

BACKGROUND

There are many types of vehicles, either land based, air based, or water based designed to transport goods, people, or conduct other type of work or recreational activities. While some of these vehicles are easily accessible like a car, a motorcycle, or truck, other crafts travel longer distances, move rapidly, or are in difficult to reach locations that create unique problems associated with the management of these crafts. For example, difficult to access crafts include aircrafts, ships, trains, space ships, deep sea exploration vehicles, submarines, military vessels, helicopters, rescue devices, etc.

One historical method of communication with crafts relies on a human element. A driver or pilot sits in front of a device and communicates via radio communication with a remote base. As technology evolved, the methods of communication between a remote station and a pilot improved but all these systems remain vulnerable to onboard problems experienced by the pilot. In case of a debilitating incident, or unexpected attack by a third party such as pirates, the remote craft is left vulnerable to theft, and manipulation. Typically a radio communication network helps provide voice and data communication between a mobile unit and a command and control center. In return, the data received from the mobile craft can include status data, such as geographic location, heading, speed, engine and fuel data transmitted back for monitoring.

In non land based system, on-board sensors and telematics can be mounted. Telematics is the integrated use of telecommunications and informatics, also known generally as Information and Communication Technology. Telematics is the science of sending, receiving and storing information via telecommunication devices, some telematics device also interact directly with sensors and other elements they monitor. Recently, with the arrival of the Global Positioning System (GPS), telematics are applied to navigational systems placed onboard vehicles with integrated computers and mobile communication systems. Within the scope of this disclosure, the term telematics is to be construed broadly to include land based asset tracking devices, vehicle tracking technology, fleet management control, satellite navigation, mobile data and mobile television telecommunication in vehicles, wireless vehicle safety communications, emergency warning onboard systems in vehicles, intelligent vehicle technologies, or even automate vehicle related services linked with vehicle movement.

FIG. 1 describes a small portable diagnostic system for a watercraft where two portable computers are used both onboard of the craft and outside of the craft to conduct diagnostic testing. A sensor is connected to different devices such as a battery, a sensor, a control device of a drive, and allows for the sensor based information to be displayed on the remote computer such as a laptop via tables and spreadsheets. Some limited graphical interface can be used to passively diagnose the vessel. This technology is not associated with the use of onboard telematics, or the creation of a useful method of control and diagnostic for crafts. This system allows maintenance crews to conduct basic maintenance checks from a boat and from a pit base located on the side of a lake. This reference teaches a tool to help racing teams anticipate breakdowns in vessels when possible by observing a change in sensed values. This device is intrusive, and cannot act upon the vessel from a distance.

FIG. 2 from the prior art a real-time monitoring system for video, audio and other data transmissions from multiple mobile units and fixed sources called transportation vehicles at one or more command and control centers. Different vehicles, such as for example airplanes are equipped with monitoring devices such as the famous "black box" recorder. Information is reported in real time via a data stream to a communication network to go to one or more command and control centers. A device is installed in the transportation vehicle that includes an emitter for sending data, a disabler to disabling the control of the vehicle from the command and control center, and a control device for monitoring events and data from the center. The control center is then capable of monitoring the different inputs from the vehicle once an alarm is enabled.

This technology offers no remote control capacities for navigation, as signals are often delayed. Further the technology is passive as it only serves as an interface for the control of a software layer operated remotely. For example, if a plane is equipped with an aft video feed, an operator on the ground is given access via a network of communication such as an IP WAN network of the feed. Much like an auto pilot would work, assuming the feed if of sufficient quality to navigate remotely the place, a remote operator can send navigational commands to the plane. This technology is not central to the vessel and cannot serve to manipulate the different components of the plane. What is needed is a method and system for remote diagnostics of vessels and watercrafts based on remote control technology capable of greater flexibility and control over the vessel that simply at the software interface level.

FIG. 3 also from the prior art shows a limited active diagnostic tool and system for maintenance programs. An onboard telematics is used to measure a single value, such as the level of oil in a car. One a preprogrammed problematic value (i.e. a low oil reading) is measured, the information is sent via a wireless system to a call sensor. Based on the type of problem encountered, the car owner is notified via cell phone, via speaker based system in his car or even via the internet that maintenance is needed and what proposed corrective actions must be taken. This system is limited to the return of information to a remote system based on a sensor based reading for initiating a human based method for diagnostic, and repair of the vehicle. What is not described is an onboard device capable of complex diagnostic control, action, and implementation from a local or a remote center.

What is needed is an integrated onboard system capable of interfacing as both a diagnostic agent and a control agent for difficult to access vessels using telematics. The system must also be used to process data and offer online monitoring, interception, diagnostic, and control. The integrated system must also be able to process data and ultimately create areas of opportunity where actions can result in optimized diagnostic and maintenance according to access to different facilities. Finally, what is needed is a remote watercraft diagnostic system capable of managing anticipatory routes of the watercraft with known maintenance ports to help optimize maintenance operations and reduce costs and disturbances with operations. Also what is needed is the capacity to interrupt normal operations of a vessel and take control in a deeper level of operation to better simulate sensitive information sent to the vessel via the telematics.

Telematics devices are computers with onboard memory and software operating within the memory. These devices also need to be serviced or accessed at regular intervals for upgrades of software, maintenance, to download stored information, access collected data, modify parameters, or collect test results when the telematics device is in test phase. To download the information, a hard wired connection via a port external to the device is accessed. A laptop, for example, can be used with a USB cable connected to a USB port on the telematics device. When the devices are difficult to access, the download and collection of data can be problematic. When data must be collected from a network of telematics devices, the collection process can be very burdensome. What is needed is a new method for collecting stored information on the telematics device, and interacting with the telematics device.

Telematics devices are equipped with a software layer in a processing space, and some type of wireless communication interface linked functionally to the processing space for communication with the external world. After data is collected from the telematics device, a software layer is used to conduct data processing before it is sent to users. For example, test data, based on the data acquired may be sent and manipulated more frequently, or may need to reach different users.

SUMMARY

The present disclosure generally relates to an onboard remote integrated telematics system controlled by local systems for diagnostics, optimized maintenance, and other applications, and more specifically to a remote integrated device with a software interface for two way control of vessel and watercraft equipment operated remotely via software system over a communication network.

BRIEF DESCRIPTION OF THE DRAWINGS

Certain embodiments are shown in the drawings. However, it is understood that the present disclosure is not limited to the arrangements and instrumentality shown in the attached drawings.

DETAILED DESCRIPTION OF THE INVENTION

Figure 1:
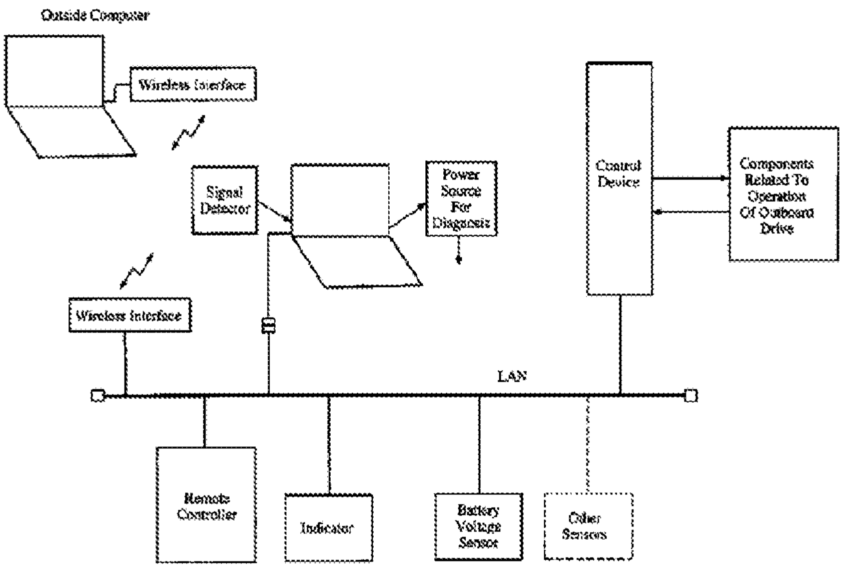
FIG. 1 (prior art)
FIG. 1 is an illustration of a small two lap top based device for the diagnostic of a watercraft from the prior art.
Figure 2:
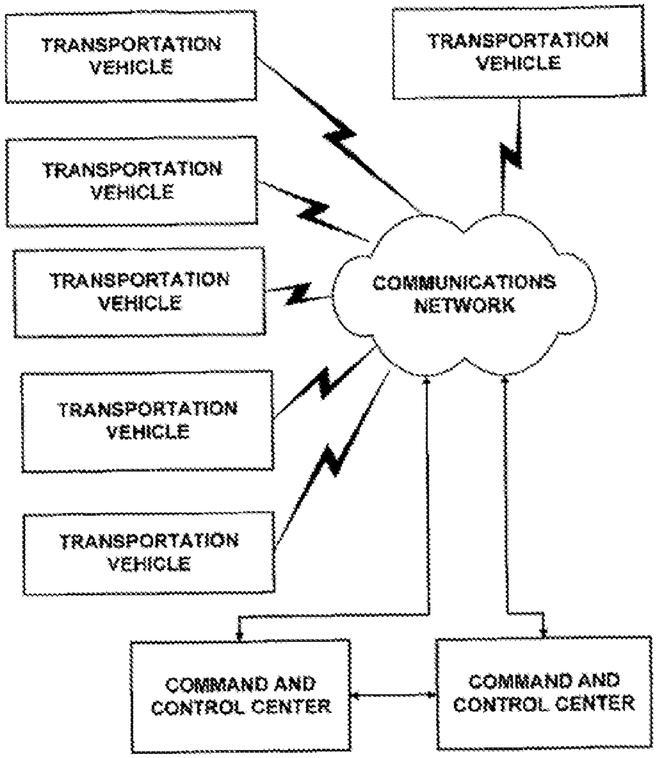
FIG. 2 (prior art)
FIG. 2 is a flow chart of data flow between different transportation vehicles and control centers via a communication network from the prior art.
Figure 3:
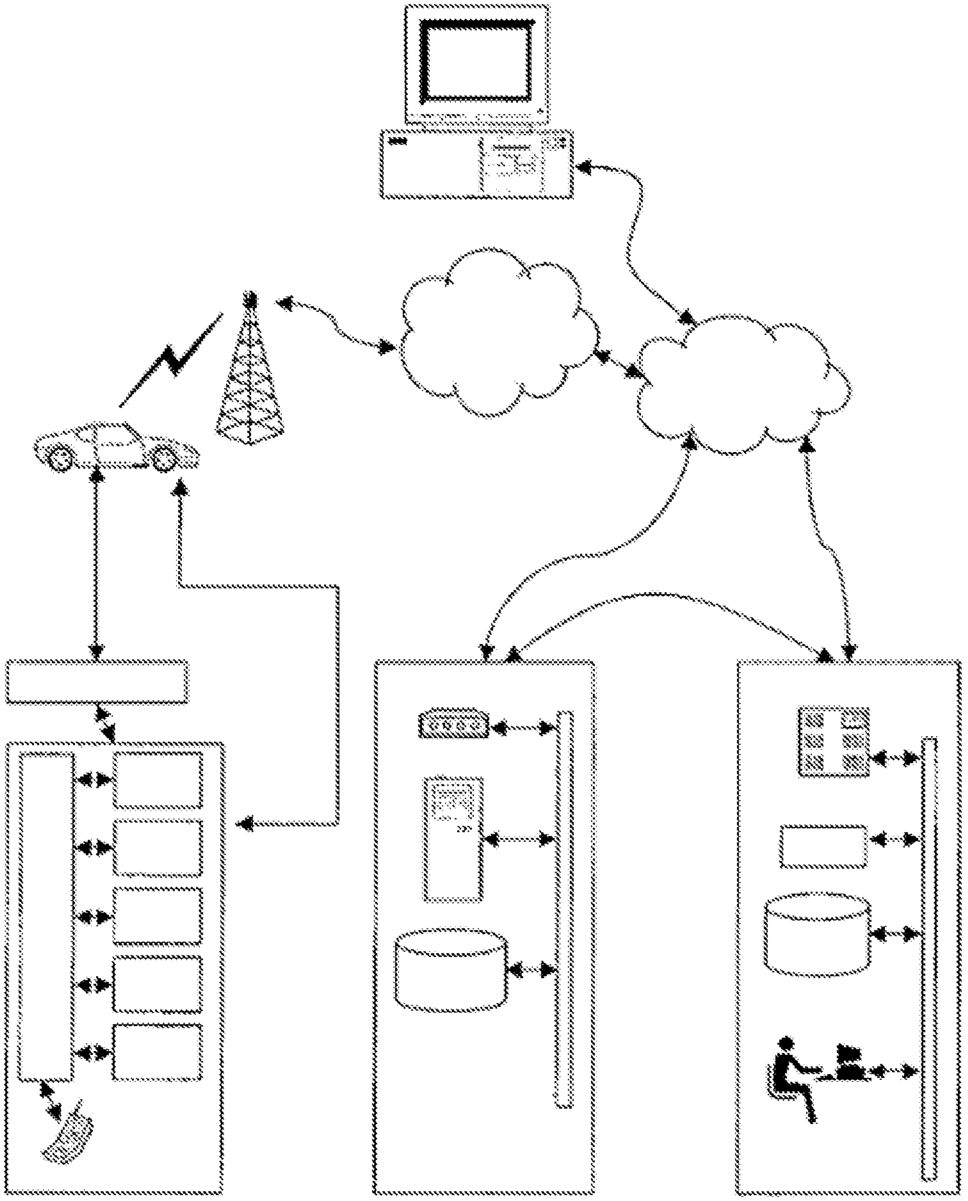
FIG. 3 (prior art)
FIG. 3 is an information flow chart for a car based diagnostic control center from the prior art.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

Within the scope of this invention, in addition to ordinary terms in the art given to the terms vessel or crafts, these terms may be understood to include any and all vehicles or movable devices containing onboard control mechanisms and capable of holding telematics for the diagnostic and control of different onboard systems of these devices. Vessels and crafts shall not be meant to be limited to man made, or man operated structures, or structures of a specific size for the transportation of regular size equipment. These terms are to be construed broadly to include any and all technology where the scope of this invention can be implemented. For example, vessels may include deep sea mobile units, aircraft carriers, oil platforms, orbital devices, dolphin mounted sonar equipment, encapsulated mobile tracers for intravenous medical treatment, and in one best mode contemplated watercrafts such as cargo ships navigating on the open sea.

As part of this disclosure, an open handed numeral series is used and given as [A, B, . . . N] to illustrate a group of remote crafts 2, 3, or 4, or remote devices 5, 6, or 7 or any other group of several elements. As part of this disclosure, the series listed as A, B, . . . N is to be understood to mean 1 or more, and is used this way as means of illustration of a multitude of elements on the drawings. For example, the series A, B, . . . N, can include any number including but not limited to 1, 2 or more. The open handed numeral series shall not be read to limit the description to any group to series larger than 2 but shall be used to describe an element, a limitation, or a function that can be used to a single element as well as to a plurality of elements where 1 is also part of the open handed series.

Figure 4:
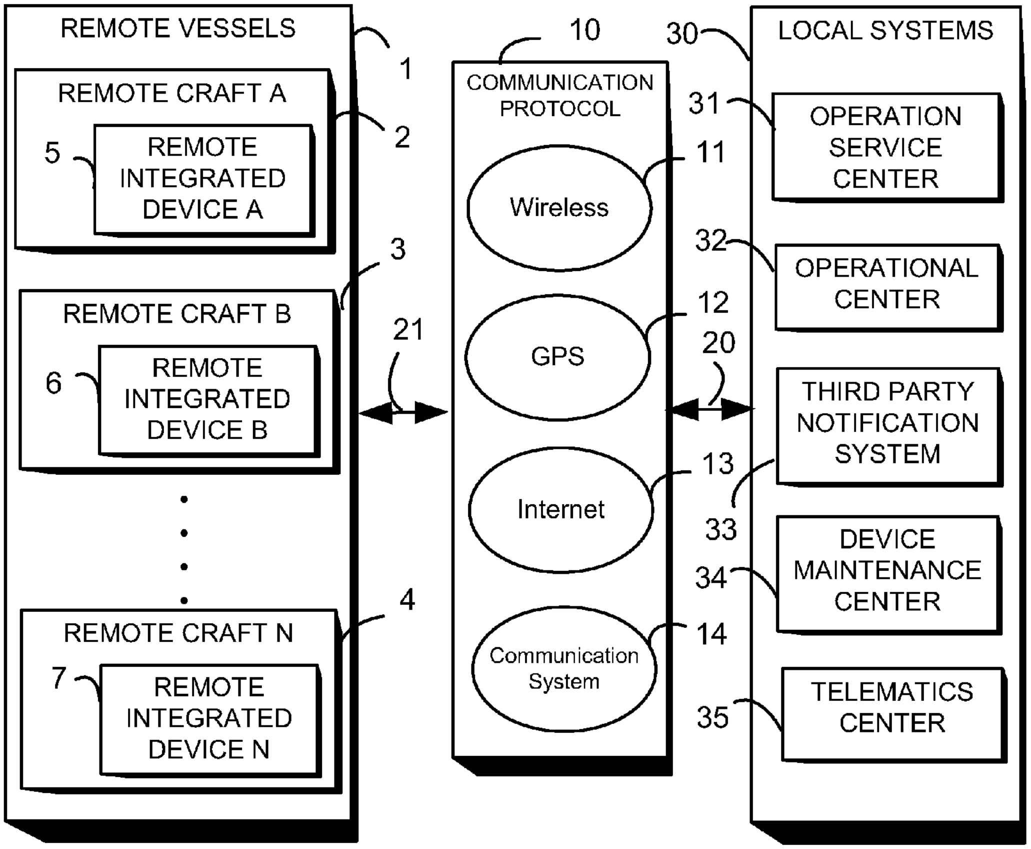
FIG. 4 is a data processing diagram of the interface of information between remote vessels and local systems using different communication protocols according to an embodiment of the present disclosure.

Generally, as part of the method and system for remote diagnostics of vessels and watercraft described herein, information is received and sent 20 as shown on FIG. 4 from local systems 30 such as for example an operation service center 31, an operational center 32, a third party notification system 33, or a craft maintenance center 34, or a telematics center 35, or any other local hardware. These different local systems 30 for example include varied hardware and software operating on differently configured servers, networks, or platforms each with interfaces for interaction with the data, such as displays, screens, printers, or more sophisticated interfaces. Further, these systems 30 are connected to emission and reception devices for receiving and sending 20 information over a large variety of communication networks, using a plurality of communication protocols. For example, FIG. 4 shows four possible protocols such as the wireless communication protocol 11, the Global Positioning System (GPS) protocol 12, the internet using the HTTP or other protocol 13, or any other communication system 14 using any associated protocol. For example, for stellar applications where a light conduit cannot be used, a laser or other beam of directional particles can be used as a protocol between a vessel and a local system. Once again, one of ordinary skill in the art of communication systems between local and remote systems will recognize the plurality of known communication methods each best suited for the remote vessel 1 targeted by the communication. FIG. 4 illustrates generally the interrelation between local systems 30, remote vessels 1, and communication protocols 10 but another other communication system may also be substituted therefore.

Figure 6:
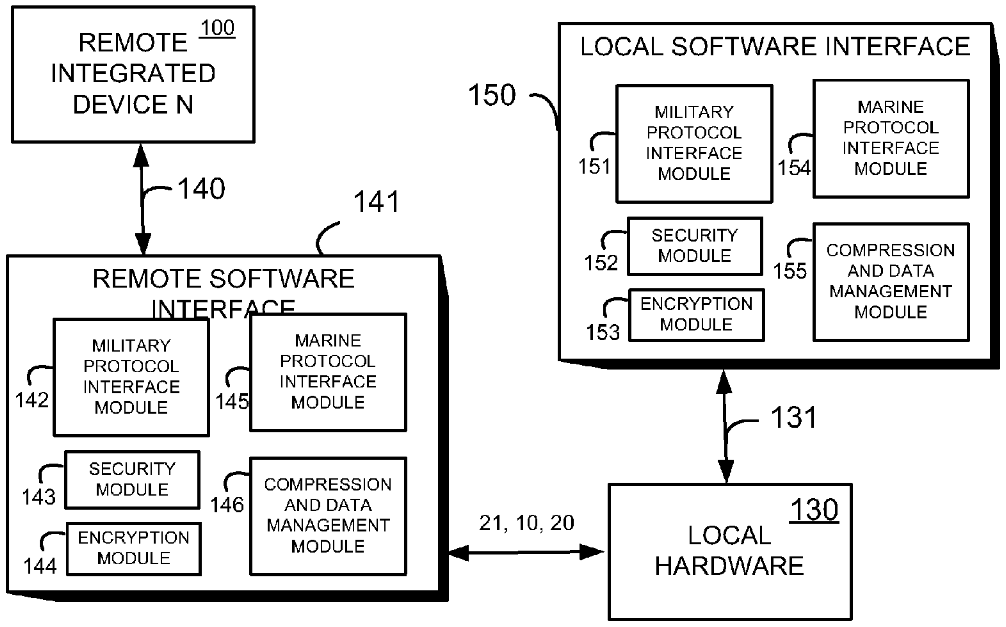
FIG. 6 is a functional diagram of a software interface for the relation between different modules for transfer of information between the remote integrated device and a local software interface on a local hardware according to an embodiment of the present disclosure.

What is described as an operation service center 31 is a hardware 130 having local software interface 150 as shown for example at FIG. 6 with a software layer. In the case of a naval vessel, the operation service center can be a head quarter base of operations where instructions are to be dispatched to the vessel for performance of the transportation to be conducted. In the case of a spacecraft, the operation service center can be a ground command base of operation where all operations directed to the spacecraft originate from the same source. In the case of military vessels, the operation service center may be any command center located off-site where orders of operation are issued. These are only several possible types of operation service centers 31 and all possible centers where commands are issued, controlled, or monitored. Operation service centers are focused on servicing customers, or performing tasks associated with the performance of one or a plurality of remote vessels.

In contrast, an operational center 32 is a local system 30 where functional elements as part of the operations of the remote vessel itself are taken into consideration. For example, all vessels operate using energy, data communication, process of information, mobility, and ultimately function. Sensors are used in association with telematics to monitor and act upon the different functions of the vessels 1. An operational center 32 may be merged in with operation service centers 31 or be distinct based on the different systems. For example, in spacecrafts, a mission control center is used to manage operations of the craft, while on a deeper level operation centers monitor each different subsystem of the spacecraft and performs different tasks on the crafts.

A third party notification system 33 is a local system that interacts with external third parties, for example in the case of naval vessels, maintenance or supply can be done by different third party entities such as grain suppliers, ports, loading dock corporations, etc. One local system as part of the system for remote diagnostics is an interface that operates and notifies third parties.

to remote vessels 1 as part of a series 1, 2, . . . n of remote crafts A, B, . . . N illustrated In the numeral series listed from 1 to n where n is any number greater than 0 including 1, what is contemplated is the use of one or more FIG. 4 illustrates remove vessels 1 located at a distance or in a remote location in two way data communication 20, 21 with a local system 30 using one of a plurality of communication protocols 10. FIG. 4 illustrates how a number (n) of crafts 2, 3, . . . n can be located at different locations around the world.

Any remote communication is contemplated, for example the use of wireless technology 11 where this protocol can be used such as a Global Positioning System (GPS).

Telematics devices are integrated informatics and telecommunication devices capable of remote communication.

A system for remote diagnostics of crafts as shown at FIG. 4, the system comprising a local system 30 with a software interface 150 shown at FIG. 6 programmed to operate in the processor of a computer wherein the software interface includes at least one element selected from a group consisting of an operation service center 31, an operational center 32, a third party notification system 33, a device maintenance center 34, and a telematics center 35. The system 30 also includes a communication system for transferring data 21, 20 using a communication protocol 10 connected to the local system 30 and at least a remote craft 1 as 2, 3, or 4 and shown at FIG. 5 connected to the communication system, the craft 2, 3, or 4 having a remote integrated device 5, 6, or 7 shown at FIG. 5 with an antenna 110 and at least one of a telematics (shown as T1 to TN) connected to an operating element 101, 102, 103, 104, 105, 106, 107, 108 and where the software interface shown at FIG. 6 is programmed to send data to and from the at least one telematics T1 to TN via the remote integrated device 5, 6, or 7 using a communication protocol 10, and wherein the data is processed by the local system 30.

Also the communication protocol 10 is a protocol associated with the transit of data taken from a group consisting of a wireless protocol 11, a GPS protocol 12, an internet protocol 13, and a communication system protocol 14. In one embodiment the software interface includes at least two elements selected from the group 11, 12, 13, and 14. In another embodiment, the software interface includes more than two elements selected from the group 11, 12, 13, and 14.

What is also contemplated is a situation where the operating element is selected from a group consisting of a command 104, a generator 105, a drive 107, an auxiliary equipment 103, a power supply 106, a cargo 108, and an information system 102. The remote integrated device 100 as shown at FIG. 6 includes more than one telematics as show at FIG. 5 each connected to a different operating element 101 to 108, and where the software interface 141 is programmed to send data to and from at least both telematics.

As shown at FIG. 6, the system comprising a remote software interface 141 located in a processor on the at least a remote craft 1, and where the local software interface 150 and the remote software interface 100 each are programmed to include a module (i.e. 142 to 146 and 151 to 155) to alter the flow of the transferred data shown by the arrow illustrating 21, 10, 20 over the communication system of FIG. 4. The module may be selected from a group consisting of a military protocol interface 142, 151, a marine protocol interface 145, 154, a security interface 143, 152, an encryption interface 153, 144, and a compression and data management interface 146, 155.

Figure 5:
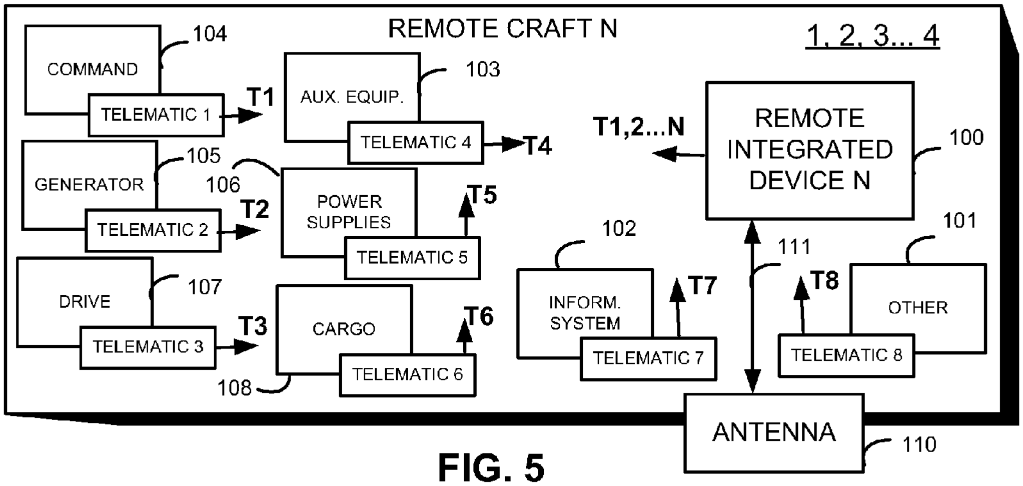
FIG. 5 is a functional diagram of a remote craft equipped with multiple telematics and a remote integrated device according to an embodiment of the present disclosure.
Figure 7:
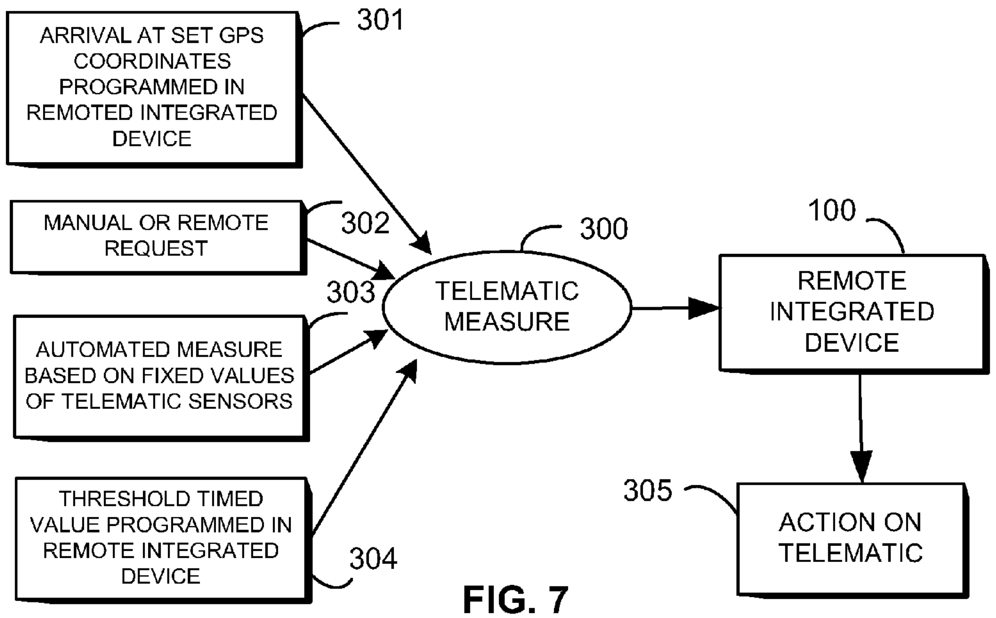
FIG. 7 is a functional diagram of input telematics measures uploaded and sent to the remote integrated device for action according to an embodiment of the present disclosure.

A system for remote diagnostics of crafts, the system comprising a local system 30 as shown at FIG. 4 with a software interface 150 as shown at FIG. 6 programmed to operate in the processor of a computer, a communication system for transferring data using a communication protocol 10 connected 20 to the local system 30, and at least a remote craft 1, 2, 3, 4 connected 21 to the communication system, the craft 1, 2, 3, 4 having as shown at FIG. 5 a remote integrated device 100 with an antenna 110 and at least one of a telematics T1 to T8 connected to an operating element 101 to 108, where the software interface 141, 150 is programmed to send data to and from the at least one telematics 140 for a telematics measure 300 as shown at FIG. 7 via the remote integrated device 100 using a communication protocol 10, where the data is processed by the local system 30, and where the telematics measure is performed based on a condition precedent.

The condition precedent is selected from a group consisting of the arrival of the vessel at a set GPS coordinate programmed in the remote integrated device 301, a manual request 302, a remote request 302, an automated measure based on fixed values of telematics sensors 303, and a threshold timed value programmed in the remote integrated device 304 as shown at FIG. 7. The telematics measure 300 is sent to the remote integrated device 100 for an action 305 by the telematics of the operating element associated with the telematics.

Figure 8:
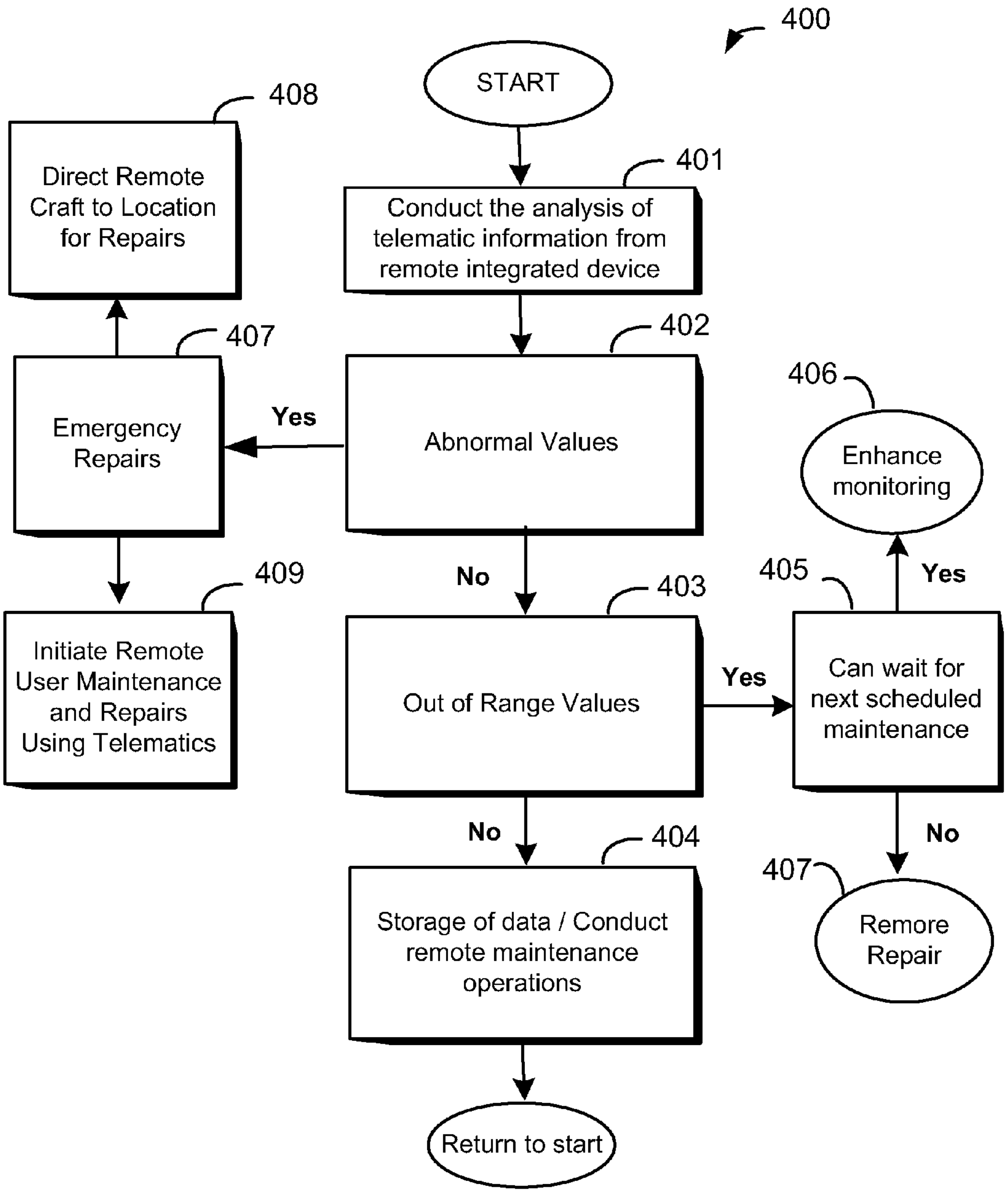
FIG. 8 is a diagram of a method for managing maintenance of a vessel equipped with a remote integrated device according to an embodiment of the present disclosure.

In another embodiment, FIG. 8 shows a method 400 for the remote maintenance of a craft, the method implemented using a system including a local system with a software interface programmed to operate in the processor of a computer, a communication system for transferring data using a communication protocol connected to the local system, and at least a remote craft connected to the communication system, the craft having a remote integrated device with an antenna and at least one of a telematics connected to an operating element, the method comprising the steps of conducting 401 an analysis of the information received from the telematics directed to the operating element to which the telematics is connected, the information received via the remote integrated device, and initiating an emergency repair signal 407 if abnormal values 402 are observed by either directing the craft to a location for repairs 408 if no remote user maintenance and repairs 409 using telematics can be initiated.

The method 400 can further comprise a step of initiating a subsequent analysis if the values are normal but out of range 403 by either directed the craft to the location for repairs 407 or to initiate enhanced monitoring procedures of the craft 406. The method 400 further can comprise a step of storing 404 the data and perform regular remote maintenance operations if the values are normal 402 and in range 403.

Figure 9:
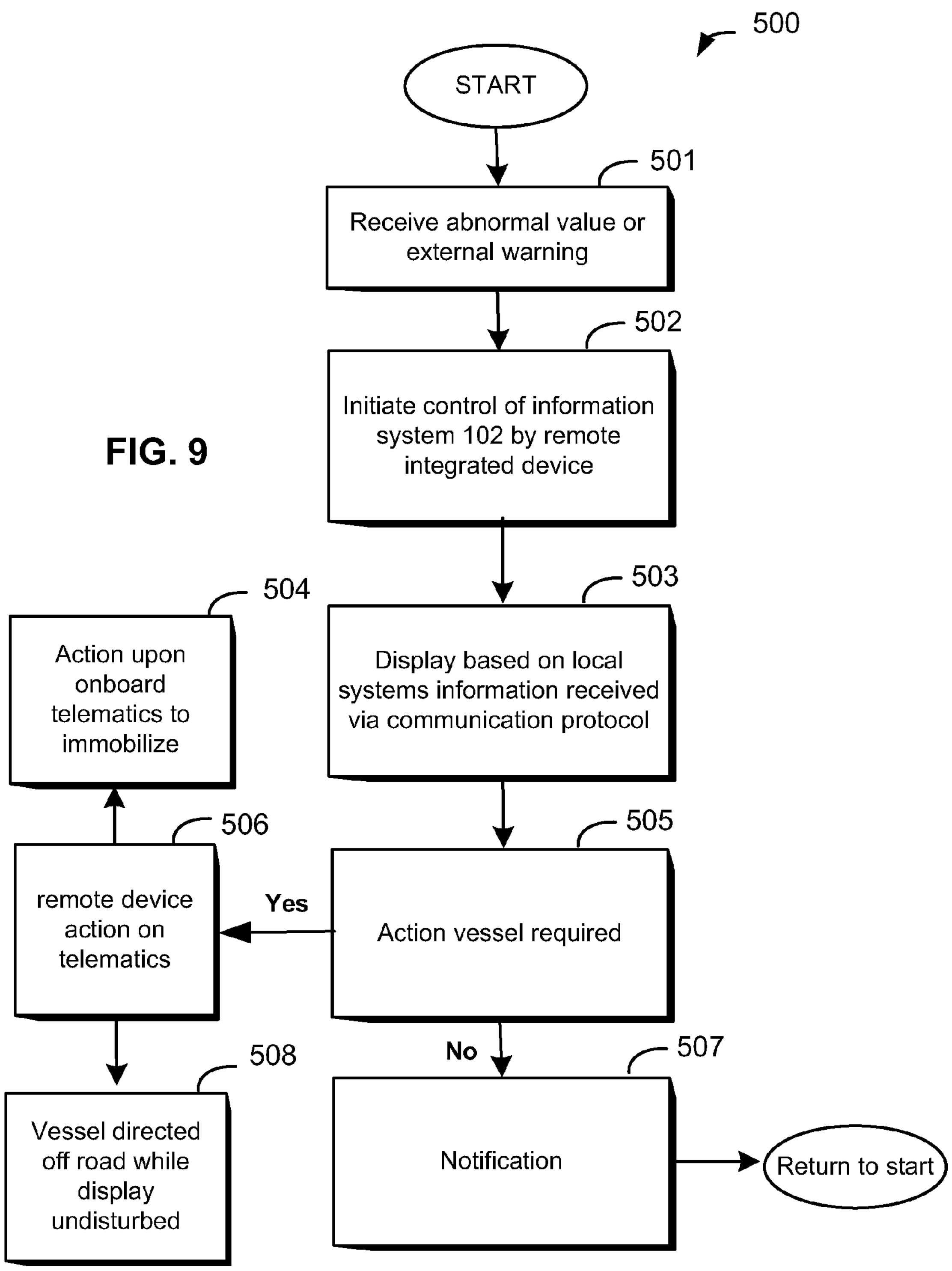
FIG. 9 is a diagram of a method for acting upon a vessel using the remote integrated device according to an embodiment of the present disclosure.

FIG. 9 shows a method 500 for the remote control of a craft, the method implemented using a system including a local system with a software interface programmed to operate in the processor of a computer, a communication system for transferring data using a communication protocol connected to the local system, and at least a remote craft connected to the communication system, the craft having a remote integrated device with an antenna and at least one of a telematics connected to an operating element, the method comprising the steps of receiving 501 abnormal value or an external warning requiring taking the control of a craft, initiating control 502 of an information control system onboard the craft by the remote integrated device, and displaying 503 at the display of the information system information received via the communication protocol sent by the local system. Subsequently, notifying 507 a third party of the change in display on the craft if no action on the craft is required. Also a step of using telematics 506 to initiate action on the operating element. The method also contemplates using the telematics 506 are used to either immobilize the craft 504 or to direct off road the craft 508.

Figure 10:
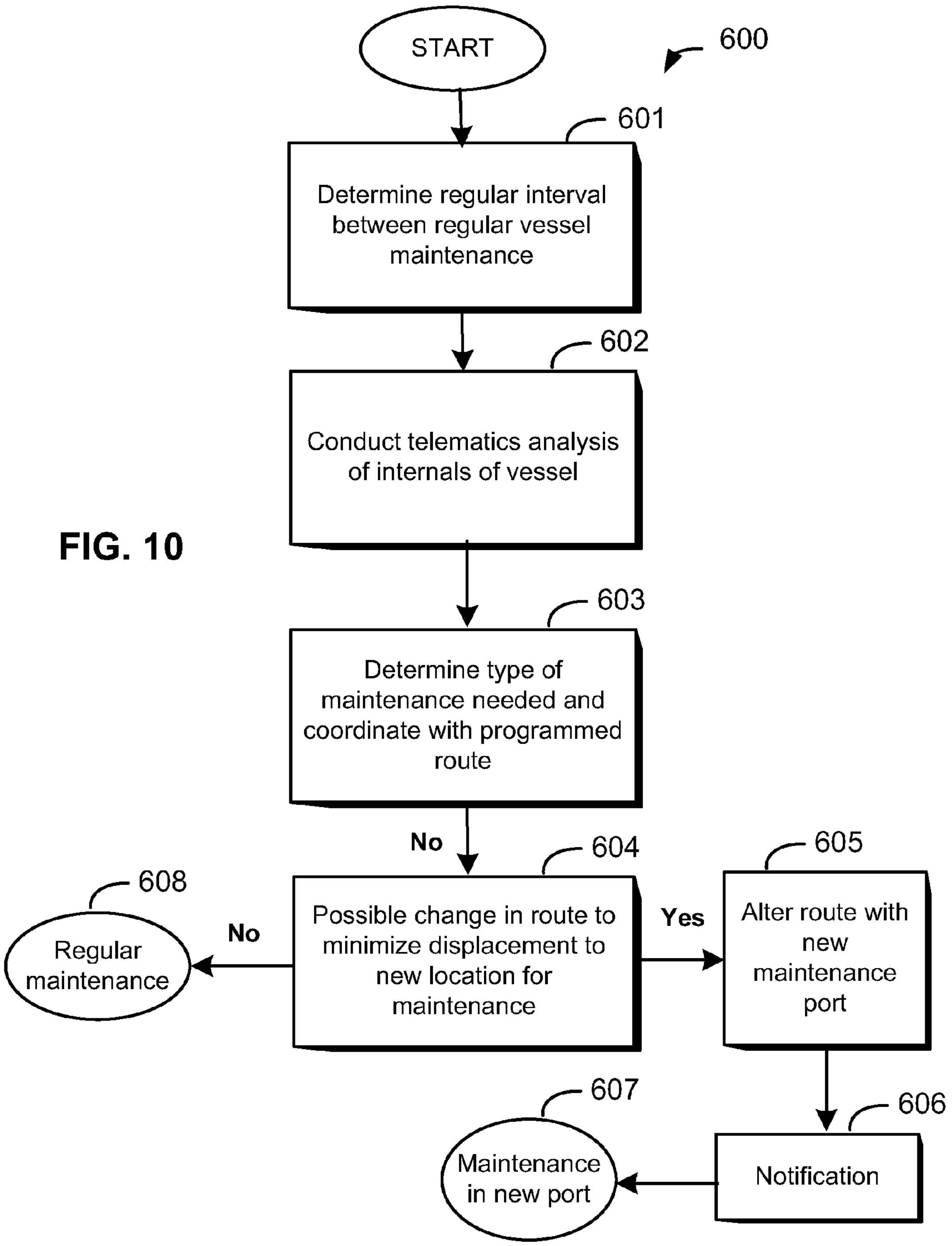
FIG. 10 is a diagram of a method for optimizing the maintenance of a vessel based using the remote integrated device according to an embodiment of the present disclosure.

FIG. 10 shows a method for the optimization of maintenance 600 of a craft, the method implemented using a system including a local system with a software interface programmed to operate in the processor of a computer, a communication system for transferring data using a communication protocol connected to the local system, and at least a remote craft connected to the communication system, the craft having a remote integrated device with an antenna and at least one of a telematics connected to an operating element, the method comprising the steps of determining 601 regular intervals between regular craft maintenance, conducting 602 an analysis of the internals of the vessel using telematics connected to at least an operating element, determining 603 the type of maintenance needed based on the analysis, and coordinate and determine the optimal maintenance needed based on a programmed route of the craft. Also contemplated is a step of altering 605 the route to a new maintenance port to minimize displacements of the craft. Also a step where the new maintenance port is notified in advance 606.

It is understood that the preceding detailed description of some examples and embodiments of the present invention may allow numerous changes to the disclosed embodiments in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A system for remote diagnostics of crafts, the system comprising:

a local system with a software interface programmed to operate in the processor of a computer wherein the software interface includes at least one element selected from a group consisting of an operation service center, an operational center, a third party notification system, a device maintenance center, and a telematics center;

a communication system for transferring data using a communication protocol connected to the local system; and at least a remote craft connected to the communication system, the craft having a remote integrated device with an antenna and at least one of a telematics connected to an operating element, wherein the software interface is programmed to send data to and from the at least one telematics via the remote integrated device using a communication protocol, and wherein the data is processed by the local system, further comprising a remote software interface located in a processor on the at least a remote craft, and wherein the local software interface and the remote software interface each are programmed to include a module to alter the flow of the transferred data over the communication system, and wherein the module is selected from a group consisting of a security interface, an encryption interface, and a compression and data management interface.

2. The system of claim 1, wherein the communication protocol is a protocol associated with the transit of data taken from a group consisting of a wireless protocol, a GPS protocol, an internet protocol, and a communication system protocol.

3. The system of claim 1, wherein the software interface includes at least two elements selected from the group.

4. The system of claim 1, wherein the software interface includes more than two elements selected from the group.

5. The system of claim 1, wherein the operating element is selected from a group consisting of a command, a generator, a drive, an auxiliary equipment, a power supply, a cargo, and an information system.

6. The system of claim 1, wherein the remote integrated device includes more than one telematics each connected to a different operating element, and wherein the software interface is programmed to send data to and from at least both telematics.

7. A method for the remote maintenance of a craft, the method implemented using a system including a local system with a software interface programmed to operate in the processor of a computer, a communication system for transferring data using a communication protocol connected to the local system, and at least a remote craft connected to the communication system, the craft having a remote integrated device with an antenna and at least one of a telematics connected to an operating element, the method comprising the steps of:

conducting an analysis of the information received from the telematics directed to the operating element to which the telematics is connected, the information received via the remote integrated device;

initiating an emergency repair signal as abnormal values are observed by either directing the craft to a location for repairs as no remote user maintenance and repairs using telematics can be initiated; and initiating a subsequent analysis as the values are normal but out of range by either directed the craft to the location for repairs or to initiate enhanced monitoring procedures of the craft.

8. The method of claim 7, wherein the method further comprises a step of storing the data and perform regular remote maintenance operations as the values are normal and in range.

9. A method for the remote control of a craft, the method implemented using a system including a local system with a software interface programmed to operate in the processor of a computer, a communication system for transferring data using a communication protocol connected to the local system, and at least a remote craft connected to the communication system, the craft having a remote integrated device with an antenna and at least one of a telematics connected to an operating element, the method comprising the steps of:

receiving abnormal value from the telematics or an external warning from the communication system requiring taking the control of a craft;

initiating control of an information control system onboard the craft by the remote integrated device;

displaying at the display of the information system information received via the communication protocol sent by the local system with the software interface programmed to operate in the processor of the computer; and using telematics to initiate action on the operating element.

10. The method of claim 9, wherein the method further comprises a step of notifying a third party of the change in display on the craft as no action on the craft is required using the communication system.

11. The method of claim 9, wherein the telematics are used to either immobilize the craft or to direct off road the craft.

12. A method for the optimization of maintenance of a craft, the method implemented using a system including a local system with a software interface programmed to operate in the processor of a computer, a communication system for transferring data using a communication protocol connected to the local system, and at least a remote craft connected to the communication system, the craft having a remote integrated device with an antenna and at least one of a telematics connected to an operating element, the method comprising the steps of:

determining regular intervals between regular craft maintenance by the local system with the software interface programmed to operate in the processor of the computer;

conducting an analysis of the internals of the vessel by the telematics connected to at least an operating element by the local system with the software interface programmed to operate in the processor of the computer;

determining by the local system with the software interface programmed to operate in the processor of the computer the type of maintenance needed based on the analysis; and coordinating the remote craft and determining the optimal maintenance needed based on a programmed route of the craft by the local system with the software interface programmed to operate in the processor of the computer.

13. The method of claim 12, wherein the method further comprises a step of altering the route to a new maintenance port to minimize displacements of the craft by the local system with the software interface programmed to operate in the processor of the computer.

14. The method of claim 13, wherein the new maintenance port is notified in advance using the communication system.

* * * * *